United States Patent Office 2,875,234
Patented Feb. 24, 1959

2,875,234

BIPHENYLYL PHOSPHOROAMIDOTHIOATES

Kenneth C. Kauer and Edgar C. Britton, Midland, Mich., assignors to The Dow Chemical Company, Midland, Mich., a corporation of Delaware No Drawing. Application October 5, 1956
Serial No. 614,056

5 Claims. (Cl. 260—461)

This invention is concerned with the biphenylyl phosphoroamidothioates having the formula

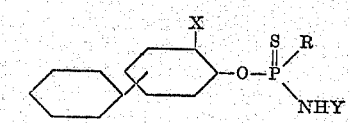

In this and succeeding formulas, X represents hydrogen, chlorine or bromine, Y represents hydrogen, methyl or ethyl, and R represents methoxy, ethoxy or NHY. These new compounds are viscous liquids or crystalline solids somewhat soluble in many organic solvents and of very low solubility in water. They have been found to be active as parasiticides and are adapted to be employed as active toxic constituents of compositions for the control of mites and insect organisms such as aphids, flies and Mexican bean beetles.

The new compounds may be prepared by reacting a phosphorochloridothioate of the formula

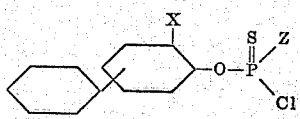

wherein Z represents methoxy, ethoxy or chlorine with aqueous or gaseous ammonia, methylamine or ethylamine. The reaction is carried out in the presence of an inert organic solvent such as acetone or methylene chloride. The reaction is somewhat exothermic and takes place smoothly at temperatures of from $-10°$ to $30°$ C. with the formation of the desired product and ammonium chloride or amine hydrochloride of reaction. The temperature may be controlled by regulating the rate of contacting the reactants and by external cooling. Good results are obtained when employing at least two molecular proportions of ammonia, methylamine or ethylamine with each molecular proportion of the phosphorochloridothioate.

In carrying out the reaction, gaseous ammonia, methylamine or ethylamine is contacted with the phosphorochloridothioate dissolved in the reaction solvent. In an alternative procedure, an aqueous solution of ammonia, methylamine or ethylamine is mixed and blended with the phosphorochloridothioate dissolved in the reaction solvent. In either case, the addition is carried out with stirring and at a temperature of from $-10°$ to $30°$ C. Upon completion of the reaction, the reaction mixture is washed with water or diluted with a water immiscible solvent and the solvent thereafter removed by evaporation or distillation under reduced pressure to obtain the desired product as a residue.

The following examples illustrate the invention but are not to be construed as limiting.

*Example 1.—O-(2-chloro-4-biphenylyl) O-methyl phosphoroamidothioate*

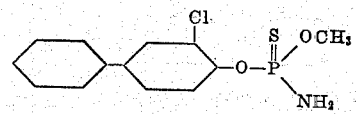

Thirty grams of a 25 percent aqueous solution of ammonia was added portionwise with stirring to a solution of 66.6 grams (0.2 mole) of O-(2-chloro-4-biphenylyl) O-methyl phosphorochloridothioate dissolved in 200 milliliters of methylene chloride. The addition was carried out over a period of 30 minutes and at a temperature of from $5°$ to $12°$ C. Stirring was thereafter continued for 2 hours while the temperature was allowed to rise to $27°$ C. Upon completion of the reaction, the reaction mixture was washed with water and the methylene chloride removed by distillation under reduced pressure to obtain an O-(2-chloro-4-biphenylyl) O-methyl phosphoroamidothioate product as a viscous liquid residue. This product had a refractive index $n/D$ of 1.6356 at $25°$ C. and contained 9.26 percent phosphorus and 10.04 percent sulfur compared to the calculated values of 9.9 percent and 11.2 percent, respectively.

*Example 2.—O-(3-biphenylyl) O-methyl phosphoroamidothioate*

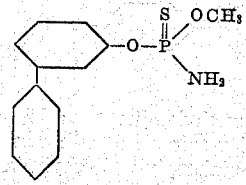

Thirty grams of a 25 percent aqueous solution of ammonia was added gradually with stirring to 60 grams (0.2 mole) of O-(3-biphenylyl) O-methyl phosphorochloridothioate dissolved in 100 milliliters of acetone. The addition was carried out over a one-hour period and at a temperature of from $3°$ to $6°$ C. Following the addition, the reaction mixture was diluted with 150 milliliters of methylene chloride and thereafter processed as described in Example 1. As a result of these operations, there was obtained an O-(3-biphenylyl) O-methyl phosphoroamidothioate product as a pale yellow, liquid residue. This product had a refractive index $n/D$ of 1.6185 at $25°$ C. and was found to contain 11.13 percent sulfur and 4.79 percent nitrogen compared to the theoretical values of 11.45 percent and 5.02 percent, respectively.

*Example 3.—O-(2-biphenylyl) O-methyl phosphoroamidothioate*

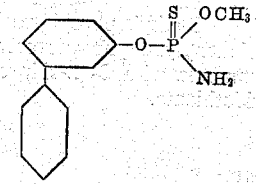

This compound was prepared in the same manner and under the same temperature conditions as those described in Example 2 by the reaction of O-(2-biphenylyl) O-methyl phosphorochloridothioate and aqueous ammonia. Upon completion of the reaction, the reaction mixture was processed as previously described to obtain the desired product as a viscous, yellow liquid having a refractive index $n/D$ of 1.6069 at $25°$ C. and a density of 1.243 at $25°$ C. This product contained 10.96 percent sulfur and 4.89 percent nitrogen compared to the calculated values of 11.45 percent and 5.02 percent, respectively.

*Example 4.—O-(2-bromo-4-biphenylyl) phosphorodiamidothioate*

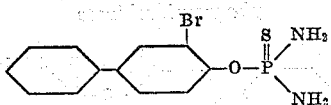

85 grams (1.25 moles) of a 25 percent aqueous solution of ammonia was added portionwise with stirring to a solution of 90 grams (0.3 mole) of O-(2-bromo-4-biphenylyl) phosphorodichloridothioate in 300 milliliters of acetone. The addition was carried out over a period of one hour and at a temperature of from 5° to 10° C. Following the addition, stirring was continued for 30 minutes while the temperature was allowed to rise to 20° C. During the reaction, an O-(2-bromo-4-biphenylyl) phosphorodiamidothioate product precipitated in the reaction mixture as a crystalline solid. This product was separated by filtration, washed with water, and thereafter recrystallized from ethanol. The recrystallized product melted at 120°–122° C. and contained 8.74 percent phosphorus and 9.80 percent sulfur compared to the theoretical values of 9.05 percent and 9.34 percent, respectively.

*Example 5.—O-(2-chloro-4-biphenylyl) O-ethyl-N-methyl phosphoroamidothioate*

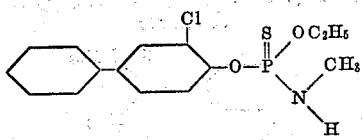

One mole of methylamine as a 25 percent aqueous solution is added portionwise with stirring to 0.5 mole of O-(2-chloro-4-biphenylyl) O-ethyl phosphorochloridothioate dissolved in 300 milliliters of acetone. The methylamine is added over a period of one hour and at a temperature of 10° C. When the addition is complete, the reaction mixture is processed as described in Example 1 to obtain the desired product as a liquid residue having a molecular weight of 341.

In a similar manner other biphenylyl phosphoroamidothioates may be prepared as follows:

O-(2-biphenylyl) O-methyl N-ethyl phosphoroamidothioate by the reaction of ethylamine with O-(2-biphenylyl) O-methyl phosphorochloridothioate.

O-(3-biphenylyl) phosphorodiamidothioate by the reaction of ammonia with O-(3-biphenylyl) phosphorodichloridothioate.

O-(2-bromo-4-biphenylyl) O-methyl N-methyl phosphoroamidothioate by the reaction of methylamine with O-(2-bromo-4-biphenylyl) O-methyl phosphorochloridothioate.

O-(2-chloro-6-biphenylyl) O-ethyl N-ethyl phosphoroamidothioate by the reaction of ethylamine with O-(2-chloro-6-biphenylyl) O-ethyl phosphorochloridothioate.

O-(2-chloro-4-biphenylyl) phosphoroamidothioate by the reaction of ammonia with O-(2-chloro-4-biphenylyl) phosphorodichloridothioate.

O-(2-biphenylyl) N,N'-diethyl phosphoroamidothioate by the reaction of ethylamine with O-(4-biphenylyl) phosphorodichloridothioate.

The new biphenylyl phosphoroamidothioates of the present invention are effective as parasiticides and are adapted to be employed for the control of numerous household and agricultural pests. For such use the products may be dispersed on a finely divided carrier and employed as dusts. The new products may also be employed in oils, as constituents in water emulsions or in water dispersions. In representative operations, 100 percent controls of bean aphids and houseflies have been obtained with aqueous compositions containing 100 parts by weight of O-(3-biphenylyl) O-methyl phosphoroamidothioate per million parts of ultimate mixture.

The O-biphenylyl O-methyl phosphorochloridothioates and O-biphenylyl O-ethyl phosphorochloridothioates employed as starting materials in the present invention may be prepared by reacting from 2 to 3 molecular proportions of methanol or ethanol with one molecular proportion of an O-biphenylyl phosphorodichloridothioate at a temperature at which hydrogen chloride is formed as a product of reaction while continuously withdrawing hydrogen chloride in the gaseous state from the reaction mixture as formed, said temperature being at least 15 centigrade degrees below the boiling point at 760 millimeters pressure of methanol or ethanol. In carrying out the reaction, the methanol or ethanol may be added portionwise to the O-biphenylyl phosphorodichloridothioate at a temperature of 40° to 50° C. and under conditions of reduced pressure in the reaction mixture. Following the reaction, the reaction mixture is partially distilled under reduced pressure to remove low boiling constituents and obtain the desired product as a crystalline or liquid residue.

We claim:
1. A biphenylyl phosphoroamidothioate having the formula

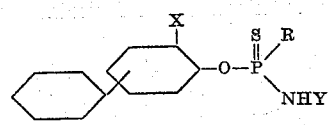

in which X represents a member of the group consisting of hydrogen, chlorine and bromine, Y represents a member of the group consisting of hydrogen, methyl and ethyl, and R represents a member of the group consisting of methoxy, ethoxy and NHY.

2. O-(2-chloro-4-biphenylyl) O-methyl phosphoroamidothioate.
3. O-(2-bromo-4-biphenyl) phosphorodiamidothioate.
4. O-(3-biphenylyl) O-methyl phosphoroamidothioate.
5. O-(2-biphenylyl) O-methyl phosphoroamidothioate.

References Cited in the file of this patent

UNITED STATES PATENTS

| | | |
|---|---|---|
| 2,033,918 | Britton | Mar. 17, 1936 |
| 2,506,344 | Cleary | May 2, 1950 |

FOREIGN PATENTS

| | | |
|---|---|---|
| 814,152 | Great Britain | Sept. 20, 1951 |